United States Patent [19]

Spinelli et al.

[11] 4,029,409
[45] June 14, 1977

[54] MULTI-MODE OPTICAL SCANNING SYSTEM

[75] Inventors: Richard A. Spinelli; Robert F. Allis, both of Rochester, N.Y.

[73] Assignee: Xerox Corporation, Stamford, Conn.

[22] Filed: June 20, 1975

[21] Appl. No.: 588,974

[52] U.S. Cl. .................................. 355/51; 355/8; 355/11; 355/66

[51] Int. Cl.[2] ................. G03B 27/48; G03B 27/50; G03B 27/70

[58] Field of Search ............. 355/8, 11, 51, 57, 60, 355/65, 66

[56] References Cited
UNITED STATES PATENTS

| | | | |
|---|---|---|---|
| 3,740,137 | 6/1973 | Sato | 355/66 |
| 3,778,153 | 12/1973 | Iki | 355/66 |
| 3,837,743 | 9/1974 | Amemiya | 355/60 |

Primary Examiner—Richard A. Wintercorn
Attorney, Agent, or Firm—Robert J. Bird

[57] ABSTRACT

A folded optical system for scanning an object and projecting its image in four modes of operation. In one mode, a stationary object is scanned by moving mirrors and its conjugate image projected at unity magnification onto a moving image surface. In a second mode, conjugate distances are varied to project an image at other than unity magnification. In a third mode, the optical system remains stationary and the object is moved relative to it to enable imaging of objects larger than the scan travel of the optics. In a fourth mode, the optics again remain stationary and an add-reflector is introduced to create a reflection cavity to increase the object conjugate for minified imaging of large moving objects. Mirrors and lens are movable to effect magnification changes.

5 Claims, 5 Drawing Figures

MULTI-MODE OPTICAL SCANNING SYSTEM

BACKGROUND OF THE INVENTION

This invention relates to optical systems and in particular to an optical system for use in a photocopying environment for scanning an object and incrementally projecting a composite image of the same at an image surface, such as a xerographic or other photosensitive surface.

There are three general types of strip scanning arrangements known to the prior art. In one type, the optical system is fixed and the object and image surface move relative to the optics. In another type, the object is fixed, and the optical system and image surface move at appropriate speeds relative to the object. In a third type, the object is fixed and is scanned by a rotating mirror to relay an image of the object onto a moving image surface.

The present invention is a combination of the first and second types enumerated above. That is, it is capable of operation with a fixed object and moving optics, and conversely with fixed optics and a moving object. The background of this invention will best be understood by reference to U.S. Pat. No. 3,832,057 issued Aug. 27, 1974 to David K. Shogren, the disclosure of which is incorporated herein by reference. Briefly, the referenced patent discloses an optical system having a stationary object platen with a moving optical system for scanning across the platen to create a flowing image of the object supported thereon. This flowing image is projected onto a synchronously moving image surface. The moving optical system includes a first reflector scanning across the object platen at a first rate of speed, and a second reflector scanning in the same direction across the platen at half speed. The object conjugate remains constant due to the differential displacements of the first and second reflectors. Light from the object propagates to the image surface by means of the first reflector, the second reflector, a reflector lens which includes a lens and adjacent reflector, and an image reflector. The lens, lens reflector, and image reflector remain fixed so that the image conjugate is constant. This system is represented in FIG. 1.

It is an object of the present invention to provide an optical scanning system of the type described which is capable of operation at various magnifications.

Another object of this invention is to provide an optical scanning system of the type described which is capable of operation with a fixed object and moving optics or conversely with moving objects and fixed optics.

Other objects, advantages, and features of this invention will become apparent from the following description thereof, taken in connection with the accompanying drawings.

SUMMARY OF THE INVENTION

This invention is practiced in one form by an optical system for projecting an image of an object from an object plane to an image plane, including a projection lens located between a support means in an object plane, and a photosensitive member at an image plane. First and second reflectors move parallel to the object plane to scan the object thereon, the reflectors moving in synchronism to maintain a constant object conjugate distance. A composite image of the strip-scanned object is thus projected onto the photosensitive member. An add reflector is selectively positionable into the optical path to combine with the second reflector to from a reflection cavity and increase the object conjugate distance for magnification change. The lens is movable relative to the optical path to adjust conjugate distances. The system is operative in several modes: with stationary object and moving optics or with moving object and stationary optics, and with or without magnification.

DRAWINGS

DESCRIPTION

Figure 1:
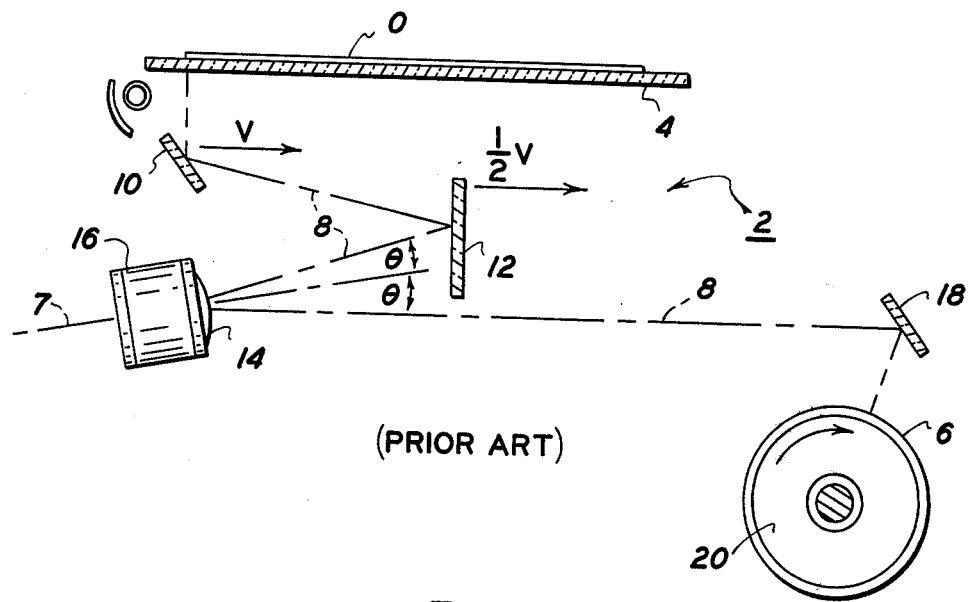
FIG. 1 is an optical diagram of a prior art system which serves as background to an understanding of the present invention.

Referring now to FIG. 1, a folded optical scanning system is represented generally at 2 and includes an object surface or platen 4 and an image surface or photoreceptor 6. An optical path 8 extends between object surface 4 and image surface 6, and is representative of the path of the principal ray of light between object surface and image surface. A first reflector 10, a second reflector 12, a reflector projection lens 14 including a lens reflector 16, and an image reflector 18 are disposed in series along the optical path 8. The image surface or photoreceptor 6 is mounted for movement relative to the optical path 8, as for example, by a rotatable drum 20.

In operation, mirror 10 moves parallel to the object surface 4 through a given displacement and at a given speed V as indicated by the arrow. Mirror 12 moves with mirror 10 at half the speed V and through a displacement half that of mirror 10. This synchronous movement of mirrors 10 and 12 maintains a constant object conjugate, and a composite image of the strip-scanned object 0 is incrementally projected from the object surface 4 onto the image surface 6.

The system described above is known to the prior art and is background to the present invention.

Figure 2:
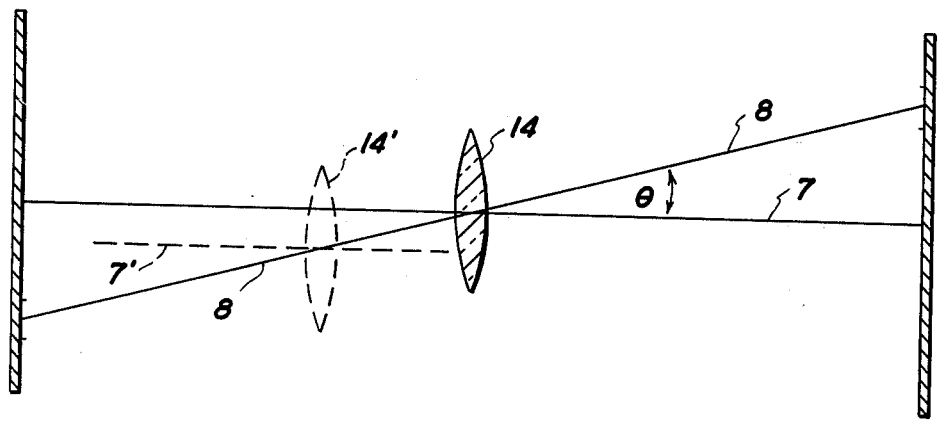
FIG. 2 illustrates the relative orientation between the lens axis and the optical path of the system, and the requirements involved in repositioning the lens for different image magnifications.

Because of the nature of the reflector lens 14 with its associated reflector 16, the optical path 8 incident to the lens and reflected back through the lens, is at some angle θ relative to the lens axis 7. FIG. 2 represents the lens 14 and its incident and emerging optical path 8 in an unfolded system to illustrate the effect of this angular deviation. When a magnification change necessitates a repositioning of lens 14, the repositioning must take into account the divergence of lens axis 7 and optical path 8. The particulars of such positioning are not material to this invention. The essential thing is only that conjugate requirements are met.

Figure 3:
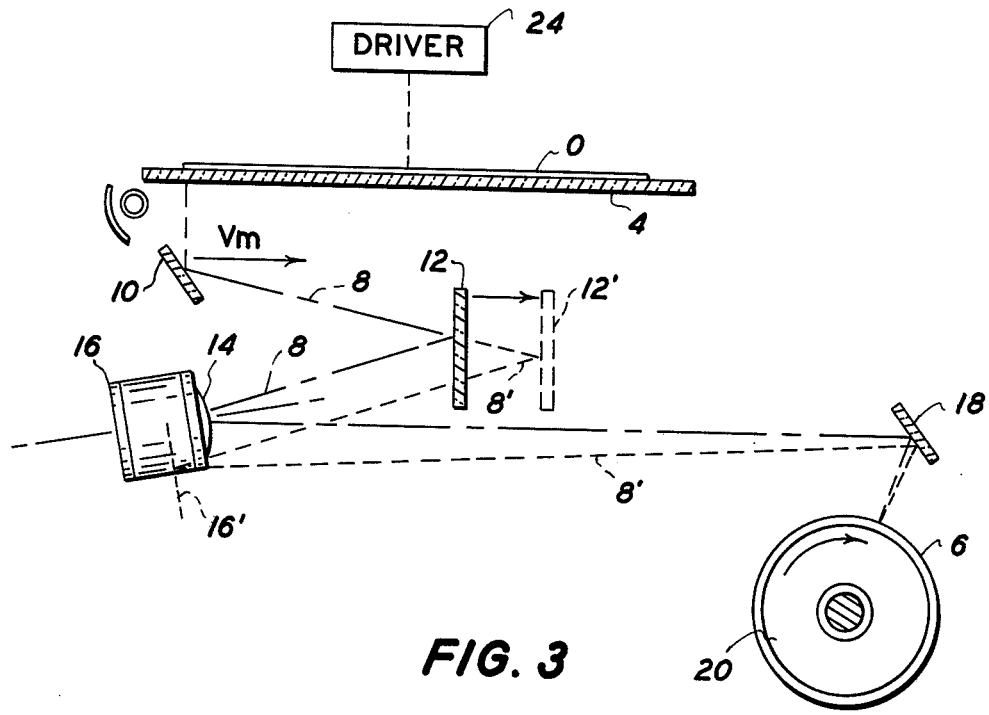
FIG. 3 is an optical diagram of a system for scanning a stationary object and imaging the same in various magnifications.

Referring now to FIG. 3, the system of FIG. 1 is shown, and in addition, in phantom lines, reflectors 12 and 16 have been displaced to positions shown at 12' and 16' respectively. (lens 14 has also moved with its reflector 16 but this has been omitted from the drawing for the sake of clarity) Likewise, optical path 8 has been displaced as represented at 8'. The displacements of reflectors 12 and 16 are for the purpose of magnification change, in accordance with the relationship $$TC = \left[\frac{f + \frac{f}{m}}{\cos\Theta}\right] + \left[\frac{f + fm}{\cos\Theta}\right]$$

wherein:

| | | |
|---|---|---|
| TC | - Total Conjugate | (defined as the distance along the principal ray from the object plane to the image plane) |
| f | - Lens Focal Length | |
| m | - Magnification | |
| $\frac{f + \frac{f}{m}}{\cos\Theta}$ | - Object Conjugate | (defined as the distance along the principal ray from the object plane to the first nodal point of the lens) |
| $\frac{f + fm}{\cos\Theta}$ | - Image Conjugate | (defined as the distance along the principal ray from the image plane to the second nodal point of the lens) |
| Θ | - Angle between optical path of principal ray and lens axis. | |

With the lens focal length known and the magnification chosen, the object conjugate and image conjugate are determined from the foregoing equation which thus dictates the positions of the lens and reflectors. When these positions are so determined, once again the system operates as before with mirror 10 moving at a certain speed $V_m$ and mirror 12 moving at half that speed to effect scanning of the object.

It will be appreciated here that in a magnification or minification mode of operation, the displacement of the optical path 8 must be accommodated. Also, magnification of other than unity in a scanning system necessitates a relationship between the speeds of object scan and image surface of other than one-to-one. This variable relationship must also be accommodated. The details of these accommodations are the subjects of applications Ser. Nos. 588,971, and 588,793 filed herewith.

Figure 4:
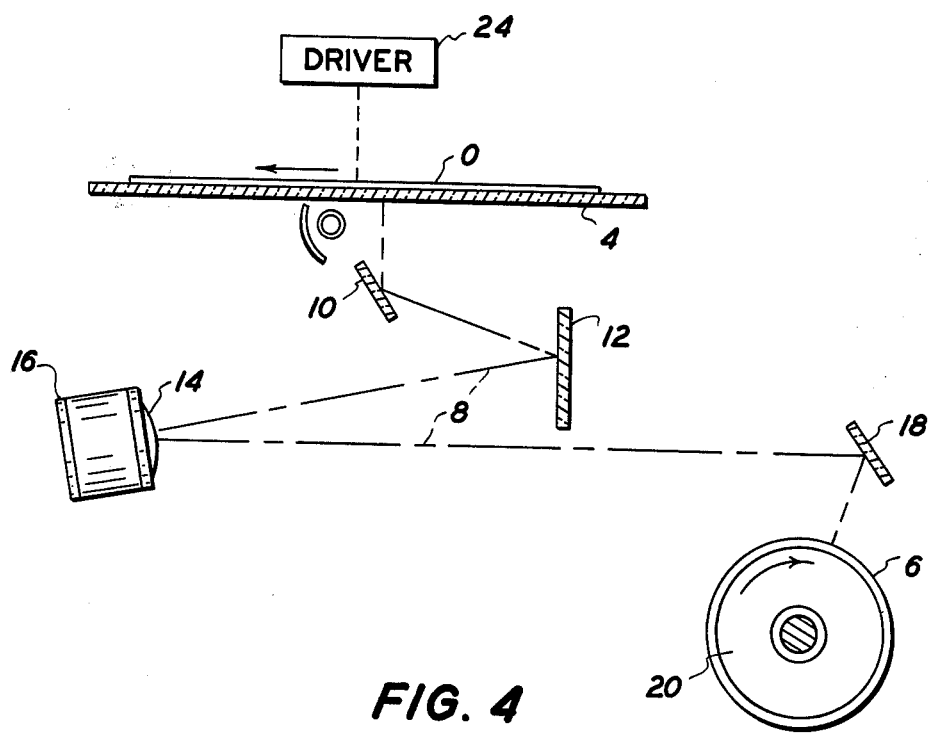
FIG. 4 is an optical diagram of a system similar to FIG. 1, but with stationary optics and a moving object.

Referring now to FIG. 4, a system similar to that of FIG. 1 is shown, except that in this case the optics are stationary and the object is mounted for movement relative to the optics, by means of a suitable driver 24.

In operation, when the object O is moved to the left as indicated by the arrow, it is effectively strip-scanned by the mirrors 10 and 12 and its image is incrementally projected onto the image surface 6. The system in FIG. 4, like that in FIG. 1, projects an image of unity magnification of the object O and the object conjugate and image conjugate distances are equal.

Figure 5:
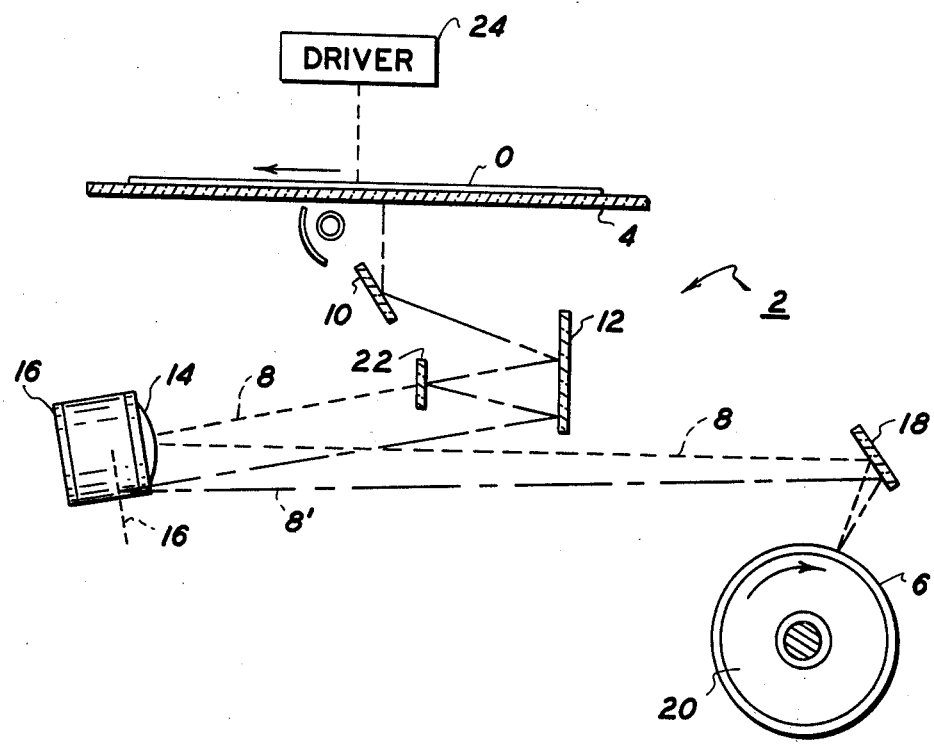
FIG. 5 is an optical diagram as in FIG. 4 with provision for projecting in various magnifications.

Referring now to FIG. 5, a similar arrangement to that of FIG. 4 is shown but further including an add reflector 22 inserted into the optical path 8 between the second reflector 12 and the lens 14. Add reflector 22 combines with second reflector 12 to form a reflection cavity to extend the length of th object conjugate of the optical path 8 for image minification. The insertion of the add reflector 22 also displaces the optical path 8 as indicated at 8'. As described in connection with FIG. 3 the projection lens 14 with its lens reflector 16 is shifted to satisfy conjugate distance requirements and to remain centered on the optical path. Thus, by means of the add mirror 22, the adjustments to reflectors 16 and 18, image minification of an object O is effected.

The arrangements shown in FIGS. 4 and 5 are especially useful in the imaging and copying of oversize objects such as large documents that extend beyond the limits of a moving optics scanning system.

In summary, in its various modes of operation, the present invention operates to scan a stationary object with moving optics to create an image at unity magnification (FIG. 1) or at other than unity magnification (FIG. 3). Conversely, it operates to scan a moving object with stationary optics to create an image at unity magnification (FIG. 4) or at other than unity magnification (FIG. 5).

The foregoing description of certain embodiments of this invention is given by way of illustration and not of limitation. The concept and scope of the invention are limited only by the following claims and equivalents thereof which may occur to others skilled in the art.

What is claimed is:

1. An optical system for projecting an image of an object from an object plane to an image plane, including the following disposed along an optical path:
   support means to support an object at said object plane,
   a projection lens,
   photosensitive means disposed at said image plane to receive an image of an object,
   first and second reflectors between said object plane and said projection lens to fold said optical path, said first and second reflectors being disposed for movement in synchronism relative to said object plane for scanning of a stationary object and to maintain a constant object conjugate distance during said scanning, said first and second reflectors being further movable one relative to the other to change said object conjugate distance,
   said support means being movable in said object plane so as to move an object for scanning of said object relative to stationary optics,
   an add reflector selectively positionable into and out of said optical path to form with one of said reflectors a reflection cavity to change said object conjugate distance,
   said lens being disposed for movement relative to said optical path to change conjugate distances, and laterally of said optical path to remain centered therein.

2. An optical system for projecting an image of an object from an object plane to an image plane, including the following disposed along an optical path:

support means to support an object for movement in said object plane,
a projection lens,
an object reflector between said object plane and said projection lens to fold said optical path,
an add reflector selectively positionable into and out of said optical path to form with said object reflector a reflection cavity to change the object conjugate distance of said system,
said lens being disposed for movement relative to said optical path to change conjugate distances,
said changes in conjugate distances effecting changes in image magnification of said system according to the following relationship:

$$TC = \left[\frac{f + \frac{f}{m}}{\cos \Theta}\right] + \left[\frac{f + fm}{\cos \Theta}\right]$$

wherein:
- $TC$ — Total Conjugate
- $f$ — Lens Focal Length
- $m$ — Magnification
- $\frac{f + \frac{f}{m}}{\cos \Theta}$ — Object Conjugate
- $\frac{f + fm}{\cos \Theta}$ — Image Conjugate
- $\Theta$ — Angle between optical path of principal ray and lens axis.

3. An optical system for projecting an image of an object from an object plane to an image plane, including the following disposed along an optical path:
support means to support, selectively stationarily and movably, an object in said object plane,
a projection lens,
first and second reflectors between said object plane and said projection lens to fold said optical path, said first and second reflectors being disposed selectively stationarily and for movement in synchronism relative to said object plane, said first and second reflectors being further movable one relative to the other to change the conjugate distance of said system,
an add reflector selectively positionable into and out of said optical path to form with one of said reflectors a reflection cavity to change said conjugate distance,
said lens being disposed for movement relative to said optical path to change said conjugate distance,
said changes in conjugate distance effecting changes in image magnification of said system according to the following relationship:

$$TC = \left[\frac{f + \frac{f}{m}}{\cos \Theta}\right] + \left[\frac{f + fm}{\cos \Theta}\right]$$

wherein:
- $TC$ — Total Conjugate
- $f$ — Lens Focal Length
- $m$ — Magnification
- $\frac{f + \frac{f}{m}}{\cos \Theta}$ — Object Conjugate
- $\frac{f + fm}{\cos \Theta}$ — Image Conjugate
- $\Theta$ — Angle between optical path of principal ray and lens axis whereby an object is selectively held stationary for scanning by moving optics and moved for scanning by stationary optics.

4. An optical system for projecting an image of an object from an object plane to an image plane, including the following disposed along an optical path:
support means to support, selectively stationarily and movably, an object in said object plane,
a projection lens,
a reflector between said object plane and said image plane to fold said optical path,
an add reflector selectively positionable into and out of said optical path to form with said reflector a reflection cavity to change the conjugate distance of said system,
said lens being disposed for movement relative to said optical path to change said conjugate distance,
said changes in conjugate distance effecting changes in image magnification of said system according to the following relationship:

$$TC = \left[\frac{f + \frac{f}{m}}{\cos \Theta}\right] + \left[\frac{f + fm}{\cos \Theta}\right]$$

wherein:
- $TC$ — Total Conjugate
- $f$ — Lens Focal Length
- $m$ — Magnification
- $\frac{f + \frac{f}{m}}{\cos \Theta}$ — Object Conjugate
- $\frac{f + fm}{\cos \Theta}$ — Image Conjugate
- $\Theta$ — Angle between optical path of principal ray and lens axis.

5. An optical system for projecting an image of an object from an object plane to an image plane, including the following disposed along an optical path:
support means to support, selectively stationarily and movably, an object in said object plane,
a projection lens,
first and second reflectors between said object plane and said projection lens to fold said optical path, said first and second reflectors being disposed selectively stationarily and for movement in synchronism relative to said object plane for scanning the same,
an add reflector selectively positionable into and out of said optical path to form with one of said reflectors a reflection cavity to change the conjugate distance of said system,
said lens being disposed for movement relative to said optical path to change said conjugate distance,
said changes in conjugate distance effecting changes in image magnification of said system according to the following relationship:

$$TC = \left[\frac{f + \frac{f}{m}}{\cos \Theta}\right] + \left[\frac{f + fm}{\cos \Theta}\right]$$

wherein:
- $TC$ — Total Conjugate
- $f$ — Lens Focal Length
- $m$ — Magnification
- $\frac{f + \frac{f}{m}}{\cos \Theta}$ — Object Conjugate
- $\frac{f + fm}{\cos \Theta}$ — Image Conjugate
- $\Theta$ — Angle between optical path of principal ray and lens axis whereby an object is selectively held stationary for scanning by moving optics and moved for scanning by stationary optics.

* * * * *